(No Model.)

A. M. PURVES.
DEVICE FOR DRYING AIR.

No. 556,692. Patented Mar. 17, 1896.

WITNESSES:
Henry Drury
Edw. F. Ayres.

INVENTOR:
Austin M. Purves
by his atty
Francis T. Chambers

UNITED STATES PATENT OFFICE.

AUSTIN M. PURVES, OF PHILADELPHIA, PENNSYLVANIA, ASSIGNOR TO THE PENNSYLVANIA SALT MANUFACTURING COMPANY, OF SAME PLACE.

DEVICE FOR DRYING AIR.

SPECIFICATION forming part of Letters Patent No. 556,692, dated March 17, 1896.

Application filed October 15, 1894. Serial No. 525,886. (No model.)

*To all whom it may concern:*

Be it known that I, AUSTIN M. PURVES, a citizen of the United States, residing in the city and county of Philadelphia, State of Pennsylvania, have invented a certain new and useful Improvement in Devices for Drying Air, of which the following is a true and exact description, reference being had to the accompanying drawings, which form a part thereof.

This invention relates to the packing of chemicals, and has for its object to provide a package of calcium chlorid of such a character that it can be conveniently handled and shipped without access of atmospheric moisture, and which may be used in its original containing vessel to serve its usual purpose as a desiccator, more particularly in confined spaces, such as ice-chests, closets, and the like. With this object in view I provide a crock, box or can having a drainage-hole at its base to contain a filling of calcium chlorid or some other compound of which that chemical forms a part, said material being so shaped or disposed in the crock, box or can that the solution formed by the absorption of atmospheric moisture will drain therefrom into and through the drainage-hole in the bottom of the crock, box or can.

In my concurrent application of even date herewith, Serial No. 525,885, I have described and claimed an air-drying package, composed of a box made in two compartments, one of which contains calcium chlorid, the other being so disposed as to receive the solution formed by the absorption of atmospheric moisture. In said application I have also described and claimed a molded cake of calcium chlorid with a corrugated or pitted surface, so as to afford a greater area of exposed surface to the air.

My present invention may embody, and preferably does embody, the features contained in said application, but is distinguished therefrom, namely, in the feature of the drainage-perforations, whereby the cake of calcium chlorid is prevented from flooding, and the package is thereby made at once more efficient and more durable.

My invention will be better understood with reference to the drawings, in which it is illustrated, and in which—

Figure 1:
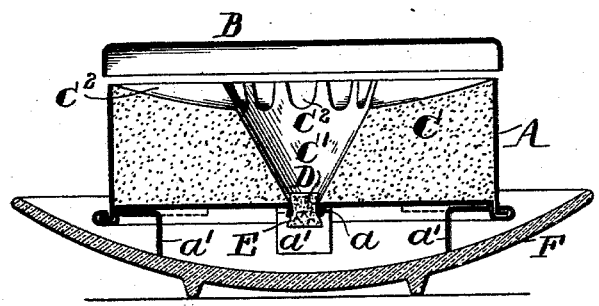
Figure 2:
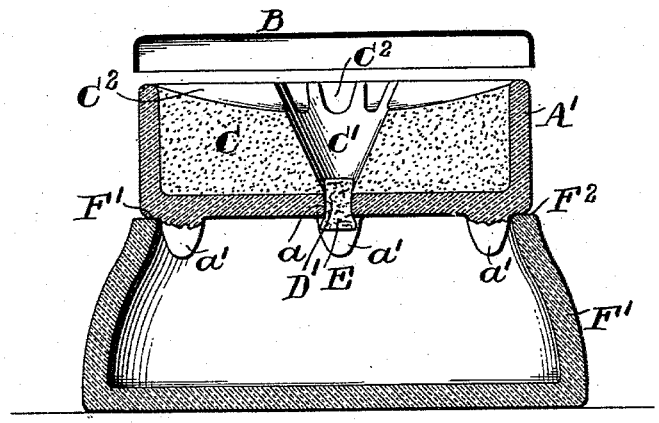

Figure 1 is a sectional view of my package made of a tin box or can; and Fig. 2 a similar view of my package made from an earthenware crock, showing also a preferable adjunct of the device.

A represents a can adapted for my use, and A', Fig. 2, a similar crock, $a$ indicating a drainage hole or holes made in the bottom of the box or crock and preferably, as shown, in the center thereof. I prefer to form a dependent flange or rib around this hole or holes to insure that the water will drip down therefrom and not spread out on the under side of the bottom.

Preferably I provide the box or crock with legs or feet $a'$ $a'$ for supporting the same in a saucer or bowl to allow the solution formed by the absorption of atmospheric moisture to drain through the hole or holes $a$. When a tin box or can is used, these legs may be made of thin strips of the same material, which normally lie flush with the bottom, as shown in dotted lines in Fig. 1, but which can be bent out to form legs, as shown in full lines.

C is a cake of calcium chlorid which is preferably molded in the crock or box and allowed to harden therein, so as to produce tight joints between it and the containing sides of the can or crock, whereby the liquid will be prevented from flowing between the cake and the can and will be caused to flow immediately through the drainage hole or holes. To facilitate the latter object, I preferably form the cake of calcium chlorid with a flared perforation C' therein, which serves as a drainage-channel. This perforation might, of course, flare to the edges of the can or crock, but to avoid loss of space I prefer to make the lower portion of this perforation C' less flaring than its upper part, as shown in Fig. 1. I also prefer to form the said perforation with inclined corrugations or gutters, as $C^2$, to facilitate the conveying off of the liquid, and to also increase the area of the exposed surface of the cake.

B is a lid for the top of the can or crock, and E is a cork or stopper in the drainage-hole, by means of which air and moisture are excluded from the cake during packing and shipping and until the package is ready for use.

When it is desired to use my package, the cork or lid is removed and the open box is set over a suitable receptacle, such as a saucer F in Fig. 1. The solution formed by the absorption of atmospheric moisture will then begin at once to flow down through the perforations C' in the cake and will escape through the drainage-hole a in the can or crock, being collected in the saucer or other receptacle in which the package is placed.

To prevent slopping and to make a more commercial device as a whole, I prefer to provide my improved package with a receptacle, such as F', Fig. 2, the upper edge of which is formed to make a joint with the bottom of the box or crock.

What I claim is—

1. As a new article of manufacture, a desiccating-package comprising a box, can or crock having a drainage-hole at its bottom, in combination with a cake of calcium chlorid cast in said box and formed with its sides sloping toward the perforation, so that moisture will drain from its exposed surface to the drainage-hole, substantially as described.

2. As a new article of manufacture, a desiccating-package comprising a box, can or crock having a drainage-hole in its bottom and legs extending below its bottom, in combination with a cake of calcium chlorid formed with a perforation, so as to present a surface flaring toward the drainage-hole, substantially as described.

3. As a new article of manufacture, a desiccating-package comprising a box, can or crock having a drainage-hole in its bottom, a water-receptacle adapted to fit beneath said box and to be covered thereby, and a cake of calcium chlorid contained in the box and formed with a flaring perforation so that condensed moisture will drain therefrom through the hole in the box, substantially as described.

AUSTIN M. PURVES.

Witnesses:
H. J. PACK,
EDW. F. AYRES.